United States Patent

[11] 3,610,539

| [72] | Inventor | Cornelis van der Lely<br>7, Bruschenrain, Zug, Switzerland |
|---|---|---|
| [21] | Appl. No. | 836,695 |
| [22] | Filed | June 26, 1969 |
| [45] | Patented | Oct. 5, 1971 |
| [32] | Priority | July 3, 1968 |
| [33] | | Netherlands |
| [31] | | 6809370 |

[54] SELF-PROPELLED WAGONS AND LORRIES
18 Claims, 4 Drawing Figs.

[52] U.S. Cl. .................................................. 239/657,
239/656
[51] Int. Cl. ...................................................... A01c 17/00
[50] Field of Search ............................................. 239/650,
656, 657, 651, 663

[56] References Cited
UNITED STATES PATENTS

| 2,180,044 | 11/1939 | Frank et al. | 239/657 |
| 2,856,191 | 10/1958 | K01b | 239/657 |
| 2,870,923 | 1/1959 | Jewell, Jr. | 239/657 X |
| 2,946,597 | 7/1960 | Simonsen | 239/656 |
| 3,235,268 | 2/1966 | McLean | 239/657 X |
| 3,260,414 | 7/1966 | Mora | 222/145 |
| 3,377,030 | 4/1968 | Swenson | 239/656 |

Primary Examiner—M. Henson Wood, Jr.
Assistant Examiner—John J. Love
Attorney—Mason, Mason & Albright ABSTRACT: A self-propelled wagon with separate compartments that form a tiltable trough. The compartments have interconnecting outlet ports with slides and individual measuring devices can be located in each compartment. A collector is mounted at the rear of the wagon and a spreader is rotatably positioned beneath the collector for spreading a mixture of materials. Controls or monitors for the slides, tilting mechanism and spreader are located in or adjacent the cab of the wagon.

INVENTOR
CORNELIS VAN DER LELY
by Mason, Mason & Albright
Attorneys

INVENTOR
CORNELIS VAN DER LELY
by Mason, Mason & Albright
Attorneys

SELF-PROPELLED WAGONS AND LORRIES

According to the invention, there is provided a self-propelled wagon or lorry of the kind set forth, wherein the trough is formed with a plurality of separate compartments and means is provided for mixing materials from said compartments during a tilting operation of the trough and spreading the mixed materials over the ground.

Figure 1:
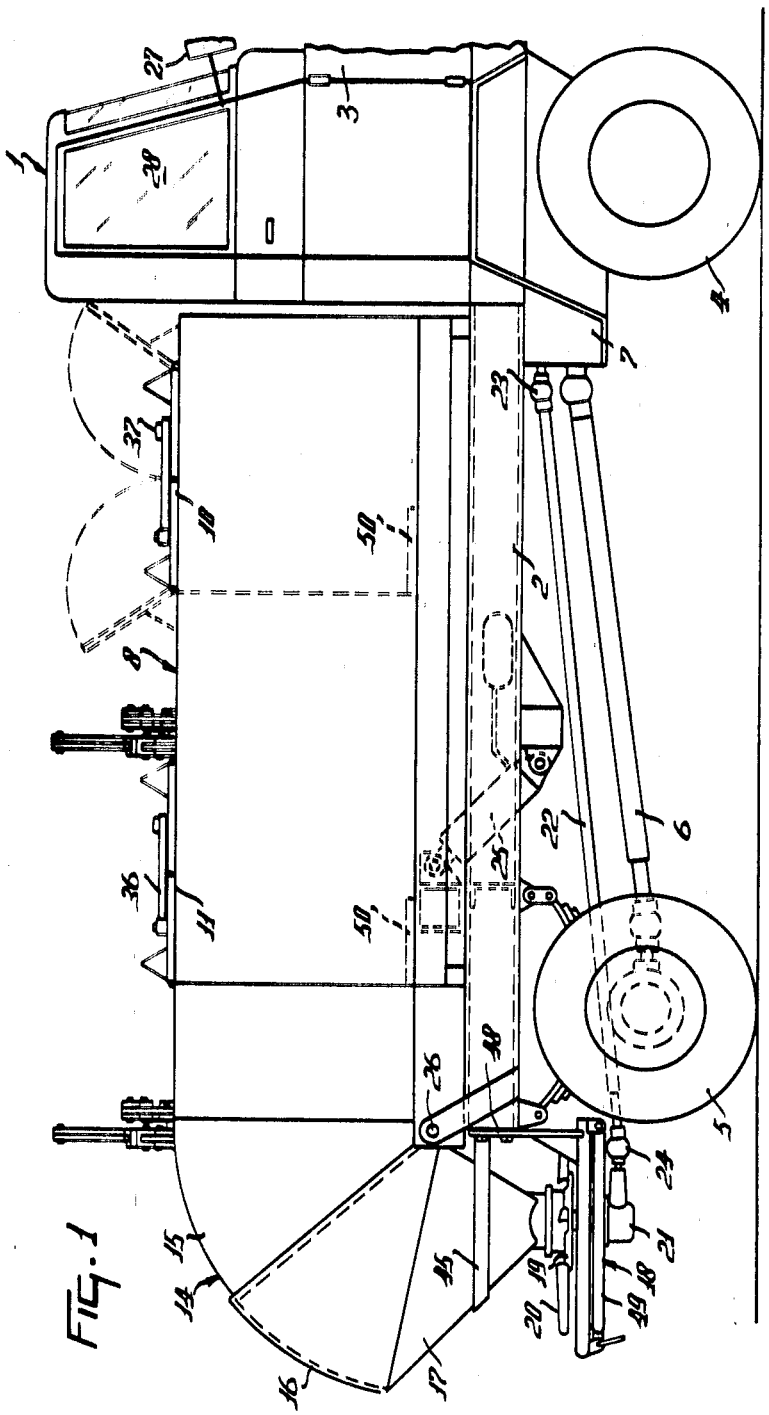
Figure 2:
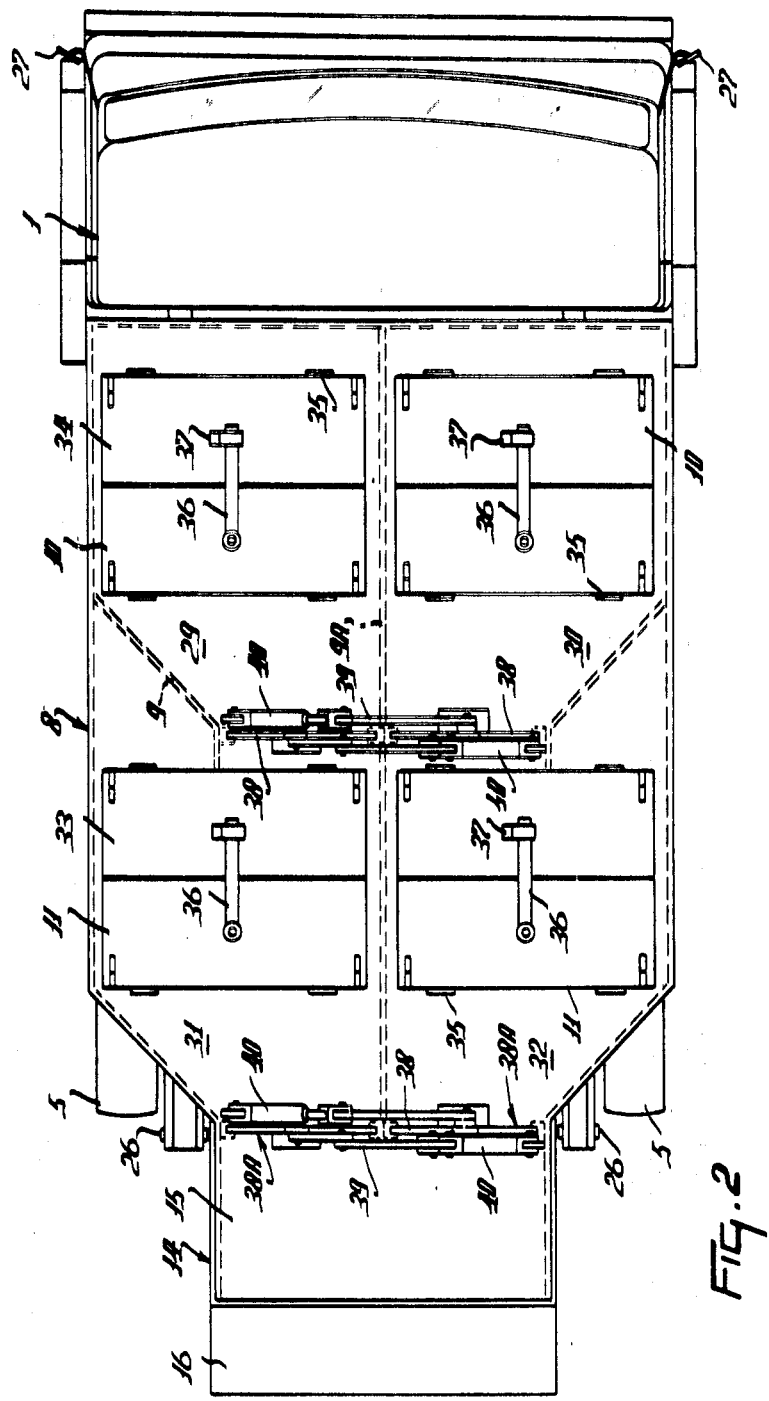
Figure 3:
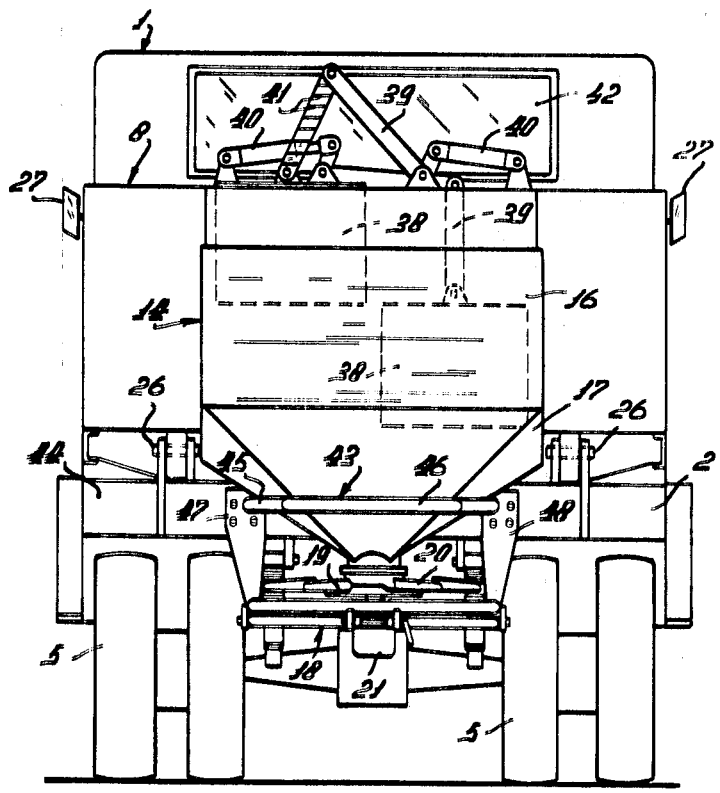
Figure 4:
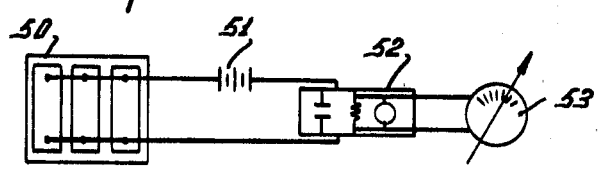

For a better understanding of the invention, and to show how the same may be carried into effect, reference will now be made, by way of example, to the accompanying drawings, in which:

FIG. 1 is a side elevation of a self-propelled wagon or lorry in accordance with the invention, FIG. 2 is a plan view corresponding to FIG. 1, FIG. 3 is a rear elevation corresponding to FIGS. 1 and 2, and FIG. 4 is a circuit diagram of a measuring device installed in the wagon or lorry of FIGS. 1 to 3.

Referring to the drawings, the self-propelled wagon or lorry 1 which is illustrated has a chassis 2 in the form of a platform of beams at the front of which a driving cab 3 is mounted. The wagon or lorry 1 has front steerable ground wheels 4 and rear unsteerable driven ground wheels 5 to which drive is transmitted in a more or less conventional manner from a front-mounted engine (not shown) by way of a transmission shaft 6. A gearbox 7 located at the rear of a lower region of the cab 3 is interposed between the engine and the transmission shaft 6 which has just been mentioned. A tiltable loading trough 8 is mounted on the longitudinally extending beams of the chassis 2 and is divided by partitions 9 and 9A into a number of different compartments. The tops of these compartments have tiltable lids or covers 10 and 11 and control members are provided by which the various compartments can be brought into communication with one another.

The rear of the loading trough 8 is provided with a collector 14, for the contents of the various compartments referred to above, said collector 14 having a first part 15 rigid with the body of the trough 8 and a second part 16 that bears a fixed position with respect to the chassis 2. As can be seen best in FIG. 1 of the drawings, the first part 15 of the collector 14 can tilt telescopically into the second part 16 thereof during a tilting movement of the trough 8 about substantially horizontal shafts 26 that afford the pivotal connection between the trough 8 and the chassis 2. Very little, if any, of the material in the trough 8 is lost with this construction during tilting of the trough 8. A funnel 17 is connected to the bottom of the second part 16 of the collector 14, said funnel 17 communicating, at its lower end, with a rotary spreading member that is generally indicated by the reference 18. The spreading member 18 has a substantially horizontal rotary disc 19 provided around its periphery with a plurality of curved spreading blades 20. The disc 19 is mounted on the substantially vertical output shaft of a small gearbox 21 whose substantially horizontal and forwardly projecting input shaft is connected to an output shaft of the gearbox 7 by way of a telescopic transmission shaft 22 having universal joints 23 and 24 at its opposite ends.

The chassis 2 supports one end of a hydraulic piston and cylinder assembly 25 whose opposite end is pivotally connected to a transverse member at the bottom of the trough 8. Extension of the piston rod of the assembly 25 thus tilts the trough 8, in an anticlockwise direction as seen in FIG. 1 of the drawings, about the aforementioned shafts 26, the first part 15 of the collector turning downwardly into the second part 16 thereof which second part remains in a fixed position with respect to the chassis 2. It is preferred to provide the cab 3 with extendable rear view mirrors 27 which are, or can be, so arranged that the operation of the rotary spreading member 18 can be seen from the cab 3 through side windows 28 thereof.

It can be seen from FIG. 2 of the drawings that the trough 8 has four of the aforementioned separate compartments 29, 30, 31 and 32 to which the tiltable lids or covers 10 and 11, and also further tiltable lids or covers 33 and 34, are connected by various hinges 35. The lids or covers 10, 11, 33 and 34 are provided in cooperating pairs, one lid or cover of each pair carrying a bar 36 which is pivotable relative thereto about a pin that is perpendicular to the plane of the cover, the free end of said bar 36 being arranged to cooperate with a bentover lug 37 on the other lid or cover of the pair to keep the two lids or covers closed. The compartments 29 to 32 can, of course, be filled when the lids or covers 10, 11, 33 and 34 are tilted into their open positions.

The rearmost end of each of the four compartments 29 to 32 is provided with an outlet port 38A, said outlet ports 38A being closable with the aid of corresponding slides 38. The slides 38 are displaceable upwardly and downwardly to open the ports 38A to chosen extents by means of lever systems 39 that are actuated by hydraulic piston and cylinder assemblies 40. It is preferred that the assemblies 40 should be controllable from the cab 3 in such a way that the positions of the slides 38 can be varied to control the rates of flow per unit time of the materials from the various compartments 29 to 32 through the corresponding outlet ports 38A. It will be readily apparent that, upon tilting the trough 8 about the shaft 26, the materials in the various compartments will tend to pour rearwardly and downwardly out of the four compartments through the ports 38A. It is also preferred that one of the arms of each of the lever systems 39 should be provided with indicating marks 41 (FIG. 3) with the aid of which a driver in the cab 3 can see the level to which the corresponding slide 38 has been raised through a rear window 42 of the cab.

It can be seen from FIGS. 1 and 3 of the drawings that the funnel 17 is supported in position by an embracing bracket 43 the limbs 45 and 46 of which are formed from telescopically interconnected lengths of tubing. The bracket 43 is connected to a transverse beam 44 of the chassis 2 and its telescopic construction has the advantage that funnels 17 of different sizes can be employed when required. It can be seen from FIG. 3 of the drawings that, to this end, a number of different connection points for the limbs 45 are provided on the beam 44, said connection points enabling the bracket 43 to be changed in width and moved upwardly and downwardly to suit various funnel sizes. The connections to the beam 44 are by way of the upper ends of supporting plates 47 and 48 whose lowermost ends carry a second bracket 49 by which the spreading member 18 and its gearbox 21 are carried. The bracket 49 is pivotably connected to the lowermost ends of the supporting plates 47 and 48 in such a way that it can be tilted downwardly from ready removal and exchange or maintenance of the various parts of the spreading member.

It is preferred that the separate compartments 29 to 32 should be provided with measuring devices which will enable their contents to be checked from the interior of the cab 3. FIG. 4 shows diagrammatically one such measuring device, an electrodynamometer 50 of the device being arranged adjacent the outlet port 38A of the corresponding compartment. The electrodynamometer 50, which may be of known construction, is pressure sensitive and cooperates with the battery 51 of the wagon or lorry 1 and a converter 52 in translating the sensed pressure into weight units that can be read on a dial 53 or other meter located inside the cab 3. The electrodynamometer 50 may include a plurality of piezo-electric crystals arranged in a transistorized circuit.

It will be apparent that the invention provides a mobile wagon or lorry from which a plurality of materials can be spread over the ground by tilting the trough 8 and simultaneously operating the spreading member 18. A single material can, of course, be spread but the wagon or lorry which has been described is particularly useful in the simultaneous spreading of two or more different materials that should be mixed with one another in a predetermined ratio. Clearly, the wagon or lorry which has been described can be used with great advantage when the mixture which is to be spread is a combination of materials that it is desirable should not remain in contact with one another for any length of time prior to distribution.

We claim:
1. A self-propelled wagon having a frame and a loading trough supported on said frame, said trough comprising a plurality of separate adjacent compartments for containing different materials, said compartments having outlet means and said trough being tiltable whereby materials can flow through said outlet means, a collector located to the rear of said outlet means to receive said materials and a spreading member positioned beneath said collector and in communication with same to spread mixed materials over the ground, said collector being comprised of at least two relatively telescopic parts that interfit one another when said trough is tilted, one of said parts being rigid and fixed relative to said loading trough.

2. A wagon as claimed in claim 1, wherein a second of said telescopic parts communicates and is fixed to a funnel and said funnel communicates directly with said spreading member.

3. A wagon as claimed in claim 2, wherein said funnel is supported on said wagon by a bracket attached to said frame.

4. A wagon as claimed in claim 3, wherein said bracket is adjustable on said frame to vary the size of said bracket.

5. A wagon as claimed in claim 4, wherein said bracket is comprised of a number of telescopically interconnected tubes.

6. A wagon as claimed in claim 1, wherein said telescopic parts are approximately sector-shaped when said wagon is viewed in side elevation.

7. A wagon as claimed in claim 1, wherein said one of said telescopic parts is pivotable about the same axis as is said tiltable trough.

8. A wagon as claimed in claim 1, wherein each compartment has a closable inlet port and an outlet port, the size of these ports being variable.

9. A wagon as claimed in claim 8, wherein each outlet port has a movable slide for varying the opening size of said port.

10. A wagon as claimed in claim 9, wherein remote control means is associated with each slide to control the movement of same.

11. A wagon as claimed in claim 10, wherein said control means is associated with a hydraulic system for moving said slides.

12. A wagon as claimed in claim 1, wherein said spreading member is a rotary spreading member at the rear of said wagon, said spreading member being driven from the engine of said wagon by driving means connecting said member with said engine, said spreading member being in communication with the interior of said trough through a funnel.

13. A wagon as claimed in claim 12, wherein said driving means includes a transmission shaft to drive said spreading member, said shaft having telescoping elements and universal joints at its opposite ends.

14. A wagon as claimed in claim 1, wherein measuring devices are located in said compartments to indicate the contents of each separate compartment, said measuring devices being associated with optical means to be readable in said cab.

15. A wagon as claimed in claim 14, wherein said measuring devices are electrodynamometers positioned to indicate weight.

16. A wagon as claimed in claim 15, wherein an electrodynamometer of said devices is arranged adjacent an outlet port of each compartment.

17. A wagon as claimed in claim 14, wherein slides are associated with said outlet ports and the levels of said slides can be determined by means associated with said cab.

18. A wagon as claimed in claim 17, wherein a lever system interconnects each slide and a hydraulic piston and cylinder assembly is included in said system to operate lever arms connected to said slides.